United States Patent
Middleton

(10) Patent No.: US 6,564,301 B1
(45) Date of Patent: May 13, 2003

(54) MANAGEMENT OF CACHES IN A DATA PROCESSING APPARATUS

(75) Inventor: Peter Guy Middleton, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 09/348,655

(22) Filed: Jul. 6, 1999

(51) Int. Cl.[7] .............................................. G01F 12/00
(52) U.S. Cl. ........................ 711/144; 711/143; 711/133; 711/156
(58) Field of Search .................. 711/141–145, 133–135, 711/156, 159

(56) References Cited

U.S. PATENT DOCUMENTS

| | | | | |
|---|---|---|---|---|
| 5,247,648 A | * | 9/1993 | Watkins et al. ............. | 711/143 |
| 5,829,030 A | * | 10/1998 | Ishida et al. ................. | 711/135 |
| 5,860,111 A | * | 1/1999 | Martinez et al. ............. | 711/143 |
| 5,895,485 A | * | 4/1999 | Loechel et al. ............. | 711/119 |
| 5,958,045 A | * | 9/1999 | Pickett ........................ | 712/229 |
| 6,119,205 A | * | 9/2000 | Wicki et al. ................. | 711/143 |
| 6,356,996 B1 | * | 3/2002 | Adams ........................ | 712/226 |

* cited by examiner

Primary Examiner—Matthew Kim
Assistant Examiner—M. D. Anderson
(74) Attorney, Agent, or Firm—Nixon & Vanderhye P.C.

(57) ABSTRACT

The data processing apparatus comprises a cache having a plurality of cache lines for storing data values retrieved from a plurality of memory regions, when a data value from a first memory region is stored in the cache and is subsequently updated within the cache by a new data value, the new data value is not transferred to memory until that new data value is removed from the cache. A marker is associated with each cache line and is settable to indicate that the data values stored in the corresponding cache line are from said first memory region. A protection unit for controlling the transfer of data values between the cache and the memory, is arranged, when said data values are to be loaded from the memory into a cache line of the cache, to determine whether said data values are from said first memory region and to cause the marker to be set accordingly. When the processor core outputs a new data value for storage, the cache is arranged to determine if the new data value is to replace a data value stored in a cache line of the cache, and if so to update the corresponding cache line with the new data value, and to apply predetermined criteria to determine whether to set an update identifier, such that when the new data value is subsequently removed from the cache it can be determined whether to transfer that new data value to the memory.

12 Claims, 6 Drawing Sheets

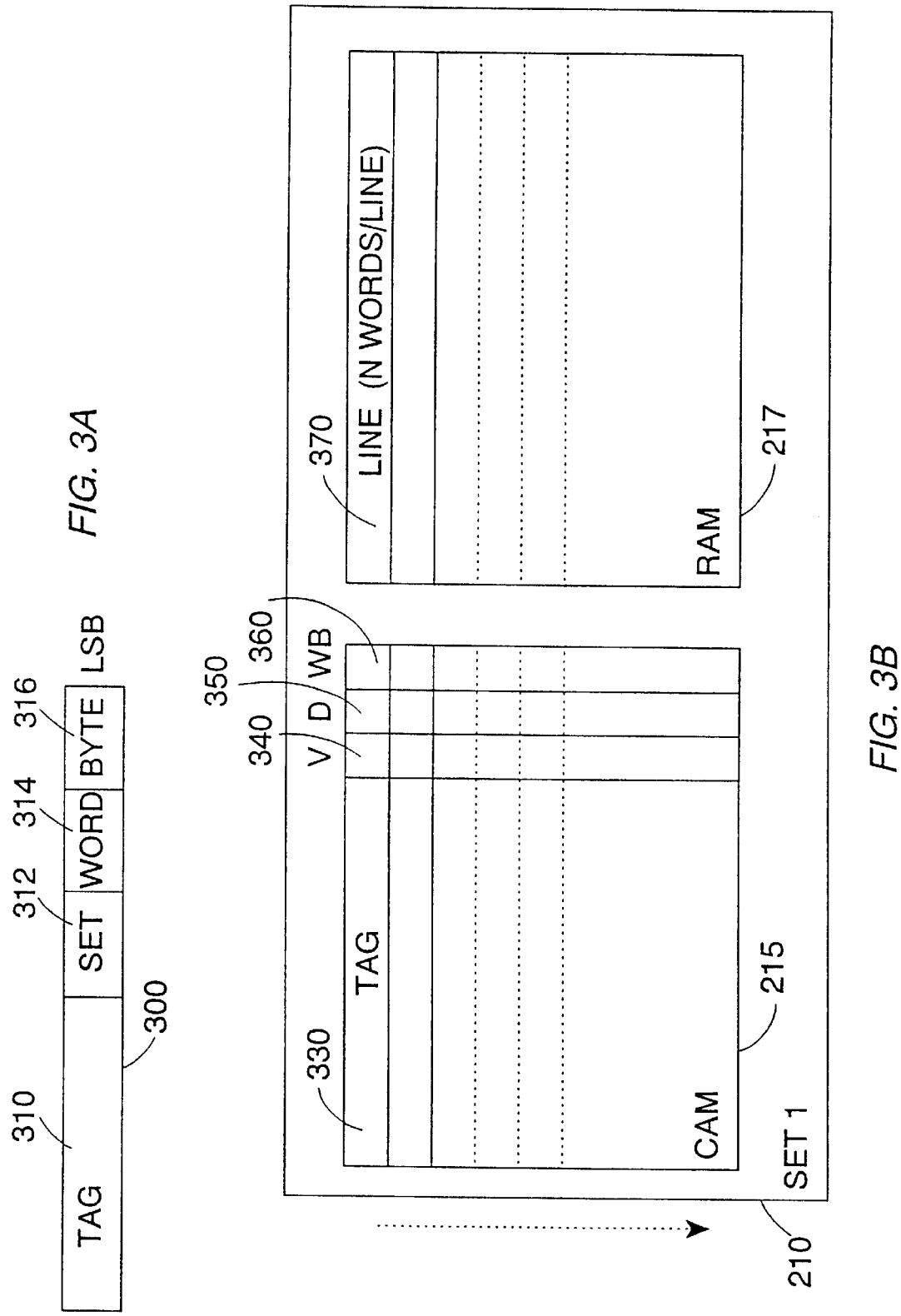

MANAGEMENT OF CACHES IN A DATA PROCESSING APPARATUS

BACKGROUND OF THE INVENTION

1. Field of the Invention

The present invention relates to the management of caches in a data processing apparatus, and in particular to the management of caches of the type where data in the cache may be associated with different types of memory region, and where the technique used to synchronise the contents of the cache with corresponding entries in the memory differs dependent on the memory region.

2. Description of the Prior Art

A cache may be arranged to store data and/or instructions so that they are subsequently readily accessible by a processor. Hereafter, the term "data value" will be used to refer to both instructions and data.

A number of different techniques have been developed for synchronising the contents of a cache with the contents of a memory, such as an off-chip main memory. For example, data values in the cache may be from a "write through" region of memory, in which case whenever a data value stored in a cache line is updated by a new data value, then that new data value is also at that time output to memory, thereby maintaining synchronisation between the data values in the cache and the data values in the memory.

Another known type of memory region is referred to as a "write back" region. If a cache is arranged to store data values from a write back memory region, then when a data value in a cache line is updated by a new data value, a "dirty bit" associated with that cache line is set to indicate that the data value has been updated. However, no action is taken at that time to update the entry in the memory. Then, when that cache line is flushed from the cache, for example to make way for a different data value to be stored in the cache, then the "dirty bit" is evaluated to determine whether any data values stored at that cache line have been updated, and if so, the data values in the cache line are then output to the memory for storage to maintain coherency.

It is becoming common to allow a cache to store data values from different regions of memory, and hence the synchronization technique employed for any particular entry in the cache will depend on the memory region associated with that entry. Hence, for example, for some data values in the cache the above-mentioned write back technique may need to be employed, whilst for other data values in the cache, the above-mentioned write through technique may need to be employed.

Whilst this development provides improved flexibility, it increases the overhead required to effectively manage the cache. In particular, when the cache determines that a new data value output by the processor core is to update a data value at a particular cache line, a protection unit provided within the data processing apparatus needs to determine in which memory region that data value is contained, and to notify the cache accordingly to ensure that the cache correctly updates the cache line. For example, if the data value is in a write through region, then the dirty bit should not be set, since the new data value will also be provided directly to the memory for storage. In contrast, if the data value is in a write back region, then the dirty bit should be set, since the new data value will not be provided directly to the memory for storage, but will only be provided later when that data value is flushed from the cache.

It has been found that the time taken by the protection unit to provide this information to the cache adversely affects the speed with which the cache can be updated, this having a knock-on effect on the efficiency of the processor core, since typically the processor core cannot begin processing the next instruction until the update to the cache has occurred.

It will be appreciated that the protection unit can be embodied as a specific logical element for controlling access to memory regions, or alternatively the function of the protection unit can be provided by a more complex logical element such as a Memory Management Unit (MMU) which can be arranged to perform additional functions. For the purposes of the present application, both of the above will be referred to as a protection unit.

It is an object of the present invention to provide an improved technique for managing caches.

SUMMARY OF THE INVENTION

Accordingly, the present invention provides a data processing apparatus, comprising: a cache having a plurality of cache lines for storing data values retrieved from a plurality of memory regions of a memory, a first memory region being such that when a data value from that first memory region is stored in the cache and is subsequently updated within the cache by a new data value, the new data value is not transferred to memory until that new data value is removed from the cache; a marker associated with each cache line and being settable to indicate that the data values stored in the corresponding cache line are from said first memory region; a protection unit for determining control parameters for controlling the transfer of data values between the cache and the memory, and being arranged, when said data values are to be loaded from the memory into a cache line of the cache, to determine whether said data values are from said first memory region and to cause the marker to be set accordingly; and a processor core arranged to output a new data value for storage; the cache being arranged to determine if the new data value output by the processor core is to replace a data value stored in a cache line of the cache, and if so to update the corresponding cache line with the new data value, and to apply predetermined criteria to determine whether to set an update identifier indicating that the data value has been updated by the new data value, such that when the new data value is subsequently removed from the cache it can be determined whether to transfer that new data value to the memory.

In accordance with the present invention, a marker is associated with each cache line, which is settable to indicate that the data values stored in the corresponding cache line are from a first memory region, and the protection unit is then adapted to determine whether those data values are in the first memory region at the time that that cache line is initially loaded with those data values from memory, and to cause the marker to be set accordingly. By this approach, when the corresponding cache line is updated with a new data value, the cache can apply predetermined criteria to determine whether to set an update identifier indicating that the data value has been updated, without having to wait for any input from the protection unit. This approach effectively removes the critical path of deciding at the time of the cache line update whether the data value is in the first memory region, and thus the efficiency of the data processing apparatus can be significantly improved.

The new data value output by the processor core may be derived from the corresponding data value as previously stored, or may be an entirely new data value derived without reference to the corresponding data value as previously stored. The data value is considered here to be 'new' in the sense that it is more recent than the data value for that address stored in either the cache or the memory.

The predetermined criteria applied by the cache at the time of updating the cache line can take a number of different forms. In one embodiment, the predetermined criteria identify that the update identifier should be set if the marker is set, whereby when the new data value is subsequently removed from the cache, the update identifier is used to determine whether to transfer that new data value to the memory. Considering the earlier example of a memory containing both a write back region and a write through region, this approach ensures that the update identifier is only set when new data values stored in the cache are from the write back region of memory, the update identifier not being set when new data values stored in the cache are from the write through region. Hence, the result is the same as that which would be achieved using the earlier identified prior art technique, but without the delay introduced by having to employ the protection unit to instruct the cache at the time of the cache line update.

In an alternative embodiment, the predetermined criteria identify that the update identifier should be set whenever a data value associated with that update identifier is updated, whereby when the new data value is subsequently removed from the cache, the update identifier is used in combination with the marker to determine whether to transfer that new data value to the memory. By this approach, the cache always sets the update identifier when a new data value is stored in the cache, irrespective of the memory region associated with that data value, and the update identifier is then used in combination with the marker at the time that a particular cache line is flushed from the cache to determine whether to transfer the new data value to the memory. The new data value will be transferred to the memory in situations where both the update identifier and the marker are set.

The marker can take a variety of forms. However, in preferred embodiments, the marker comprises a marker field provided in the cache for each cache line, the marker for a particular cache line being set by storing a predetermined logic value in the corresponding marker field. Preferably, each marker field comprises a single bit, and hence the predetermined logic value used to set the marker may be a logic zero or a logic one value. In the preferred embodiment, the predetermined logic value is a logic one value.

As with the marker, the update identifier can also take a number of forms. However, in preferred embodiments, the update identifier comprises a dirty field provided in the cache for each cache line, the update identifier for a particular cache line being set by storing a predetermined logic value in the corresponding dirty field. Preferably, each dirty field comprises a single bit, and hence the predetermined logic value may be a logic zero or a logic one value. In the preferred embodiment, the predetermined logic value is a logic one value.

It will be appreciated that the present invention is applicable to caches that store data values from a memory having a variety of different memory regions. However, in preferred embodiments, the first memory region is a "write back" region, and at least one further memory region is a "write through" region.

In preferred embodiments, each cache line of the cache will be arranged to store data values of a specified length. It is possible, for example, that a cache line may be arranged to store a single data word. However, in preferred embodiments, each cache line is arranged to store a plurality of data values, each data value stored in a cache line comprising a data word.

In preferred embodiments, the cache further comprises a validity identifier associated with each cache line which is set to confirm that the data values stored in the corresponding cache line are valid, and is resettable to indicate that at least one of the data values stored in the corresponding cache line has been invalidated. In accordance with the earlier mentioned embodiment, wherein when a new data value is stored in the cache, the update identifier is only set if the marker is set, then the validity identifier is used in combination with the update identifier to determine whether to transfer the new data value to the memory. If the new data value is invalid, then in preferred embodiments it is not output to the memory for storage. In the alternative embodiment where the update identifier is always set when a new data value is stored in the cache, irrespective of the value of the marker, then the validity identifier is used in combination with the marker and the update identifier to determine whether to transfer the new data value to the memory.

The validity identifier preferably takes the form of a valid field provided in the cache for each cache line, the validity identifier for a particular cache line being set by storing a predetermined logic value in the corresponding valid field. Preferably, each valid field comprises a single bit, and hence the predetermined logic value used to indicate that the corresponding data value is valid may be a logic zero or a logic one value. In the preferred embodiment, the predetermined logic value is a logic one value.

Viewed from a second aspect, the present invention provides a method of managing a cache in a data processing apparatus, the cache having a plurality of cache lines for storing data values retrieved from a plurality of memory regions of a memory, a first memory region being such that when a data value from that first memory region is stored in the cache and is subsequently updated within the cache by a new data value, the new data value is not transferred to memory until that new data value is removed from the cache, the method comprising the steps of: (a) providing a marker associated with each cache line which is settable to indicate that the data values stored in the corresponding cache line are from said first memory region; (b) when said data values are to be loaded from the memory into a cache line of the cache, determining whether said data values are from said first memory region; (c) setting the marker dependent on the determination at said step (b); (d) determining if a new data value is to replace a data value stored in a cache line of the cache, and if so updating the corresponding cache line with the new data value; and (e) upon updating the corresponding cache line with the new data value, applying predetermined criteria to determine whether to set an update identifier indicating that the data value has been updated, such that when the new data value is subsequently removed from the cache it can be determined whether to transfer that new data value to the memory.

BRIEF DESCRIPTION OF THE DRAWINGS

The present invention will be described further, by way of example only, with reference to a preferred embodiment thereof as illustrated in the accompanying drawings, in which:

FIG. 3A illustrates the components of an address in accordance with the preferred embodiment of the present invention;

FIG. 3B illustrates in more detail a portion of a cache arranged in accordance with the preferred embodiment of the present invention;

DESCRIPTION OF A PREFERRED EMBODIMENT

Figure 1:
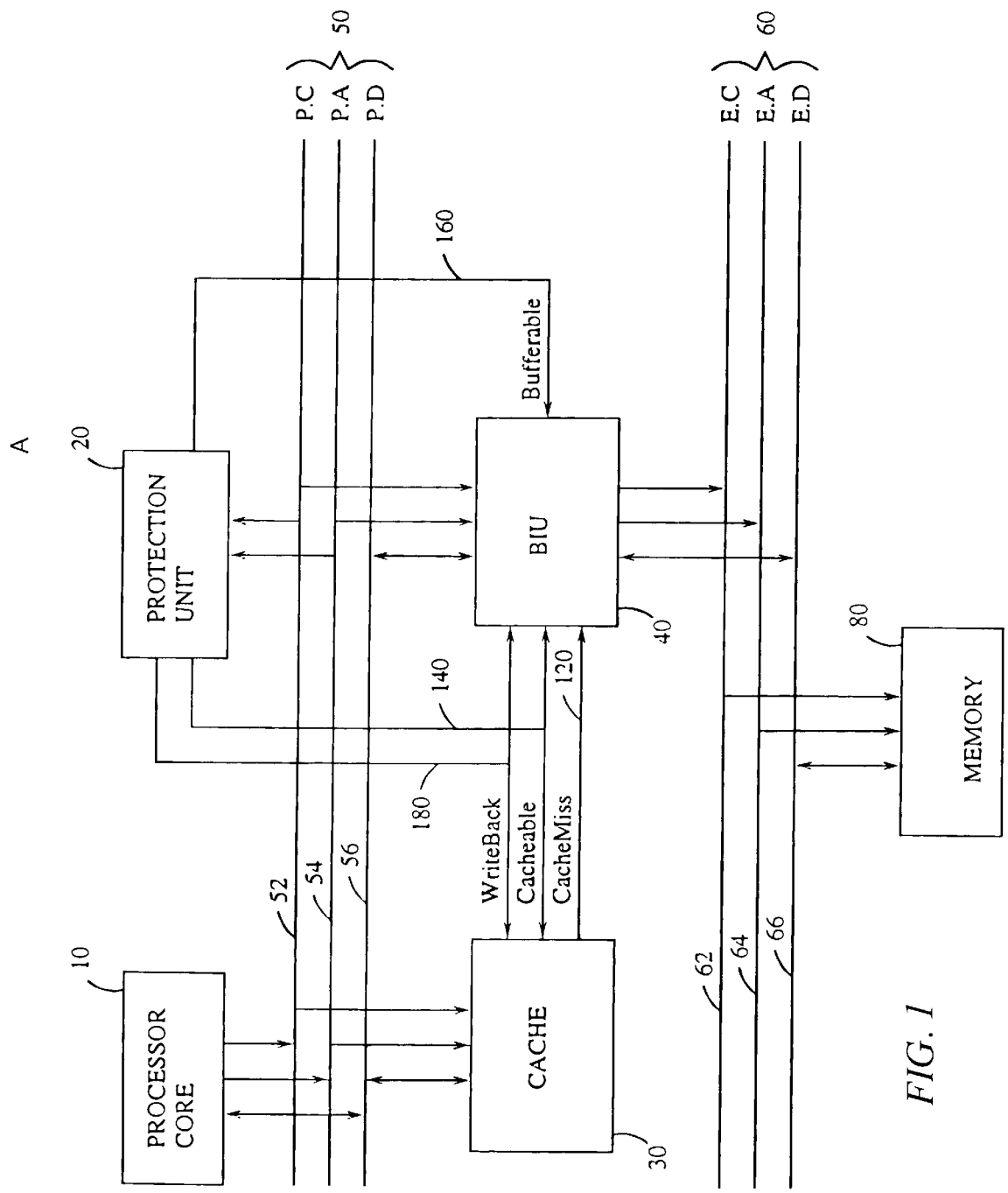
FIG. 1 is a block diagram illustrating a data processing apparatus in which the cache management technique of preferred embodiments of the present invention may be employed.

A data processing apparatus in accordance with the preferred embodiment of the present invention will be described with reference to the block diagram of FIG. 1. As shown in FIG. 1, the data processing apparatus has a processor core 10 arranged to process instructions received from memory 80. Data required by the processor core 10 for processing those instructions may also be retrieved from memory 80. A cache 30 is provided for storing data values (which may be data and/or instructions) retrieved from the memory 80 so that they are subsequently readily accessible by the processor core 10. The cache 30 includes cache control logic for controlling the storage of data values in the cache 30 and for controlling the retrieval of the data values from the cache. Whilst it will be appreciated that a data value may be of any appropriate size, for the purposes of the preferred embodiment description it will be assumed that each data value is one word in size, and the term data word will hence be used to refer to a data value of preferred embodiments.

When the processor core 10 requires to read a data word, it initiates a request by placing an address for the data word on processor address bus 54, and a control signal on control bus 52. The control bus includes information such as whether the request specifies instruction or data, read or write, word, half word or byte. The processor address on bus 54 is received by the cache 30 and compared with the addresses in the cache to determine whether the required data word is stored in the cache 30. If the data word is stored in the cache 30, then the cache 30 outputs the data word onto the processor data bus 56. If the data word corresponding to the address is not within the cache 30, then the bus interface unit (BIU) 40 is used to retrieve the data word from memory 80.

Simultaneously with the cache 30 lookup taking place, the protection unit 20 receives the signals on processor address bus 54 and control bus 52. Different regions of memory 80 within the system of FIG. 1 may be defined as having different attributes such as cacheable (and then write-through or write-back), bufferable, and access restrictions such as "no restrictions", "read only", "write only" and "no access". For the description of this preferred embodiment, it shall be assumed that there are no access restrictions, as the present invention is unaffected by access restrictions.

In this embodiment, the protection unit 20 maps all memory 80 and determines a number of memory attributes identifying whether the access is cacheable, bufferable and whether it relates to a writeback region. The cacheable attribute is passed over path 140 to the cache 30 and BIU 40, the bufferable attribute is passed over path 160 to the BIU 40, and the writeback attribute is passed over path 180 to the cache 30 and BIU 40.

The protection unit 20 determines the memory attributes at the same time as the cache 30 lookup to maintain speed. If the data word requested is in the cache 30, and the protection unit 20 indicates that the data at that address is cacheable on signal 140, then the processor core 10 will use the data word returned from the cache 30. If the data word requested is not in the cache, indicated by a cache miss signal on path 120, or the protection unit 20 indicates that the data at that address is non-cacheable on signal 140, the BIU 40 will be instructed to access the memory 80 for the data word.

The BIU 40 will examine the processor control signal on bus 52 to determine whether the request issued by the processor core 10 is a read or write instruction. For a read request, where there is either a cache miss (indicated by signal on path 120) or the data is non-cacheable (indicated by cacheable signal on path 140), the BIU will initiate a read from memory 80, passing the address from bus 54 onto the external address bus 64. A control signal is placed on bus 62. The memory 80 will determine from the control signal on bus 62 that a memory read is required and will then output on the data bus 66 the data word at the address indicated on address bus 64. The BIU 40 will then pass the data from data bus 66 to the processor data bus 56, where it can be read by the processor core 10. Additionally, if the address on bus 54 was indicated by the protection unit 20 as being cacheable (via signal on path 140), then the data word retrieved from the memory 80 and placed on the processor data bus 56 will also be stored in the cache 30. Subsequently, that data word can readily be accessed by the processor core 10 directly from the cache 30.

A cache 30 typically comprises a number of cache lines, each cache line being arranged to store a plurality of data words. When a data word is retrieved from memory 80 for storage in the cache 30, then in preferred embodiments a number of data words are retrieved from memory in order to fill an entire cache line, this technique often being referred to as a "linefill". In preferred embodiments, such a linefill results from the processor core 10 requesting a cacheable data word that is not currently stored in the cache 30, this invoking the memory read process described earlier. Such an approach is often referred to as an "allocate on read miss" approach. However, other approaches may be used, for example "allocate on write miss" or "allocate on read or write miss".

Since a linefill requires the memory 80 to be accessed via the external bus 60, this process is relatively slow, and is governed by the memory speed and the external bus speed. In accordance with preferred embodiments of the present invention, the protection unit 20 is arranged to perform some additional processing in order to output a further control signal to the cache over line 180 that is used during this period by the cache's cache control logic. This process will be discussed in more detail with reference to FIGS. 2 and 3.

Figure 2:
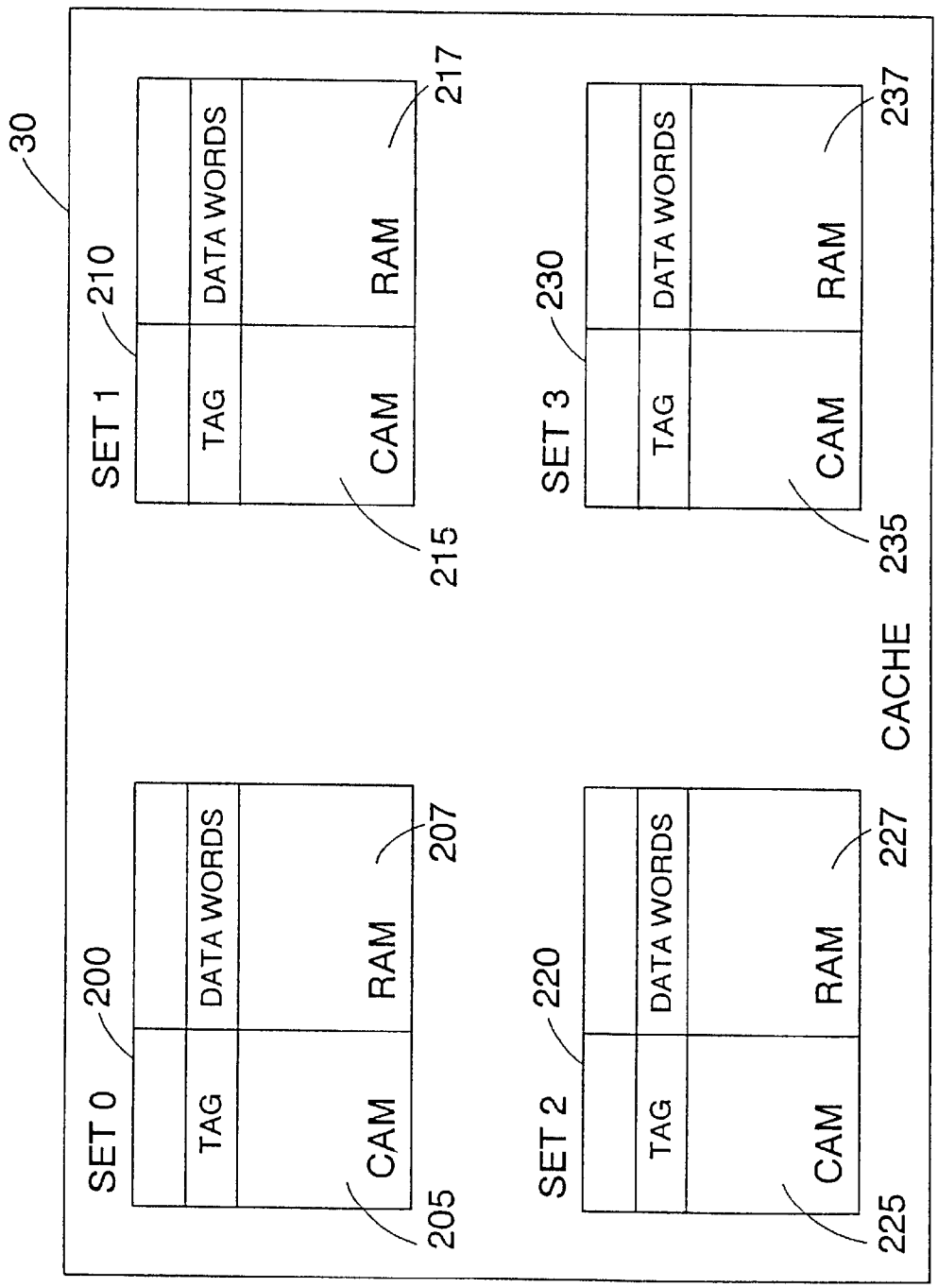
FIG. 2 illustrates an example of a cache in which the preferred embodiment of the present invention may be employed.

FIG. 2 illustrates the structure of the cache 30 in accordance with the preferred CAM/RAM based embodiment of the present invention. In this embodiment, the cache consists of four sets 200, 210, 220 and 230, although it will be appreciated that more sets or as few as one set may be provided. Each set contains a Content Addressable Memory (CAM) portion 205, 215, 225 and 235 and a Random Access Memory (RAM) portion 207, 217, 227 and 237. The RAM portion of each set contains a plurality of cache lines that are arranged to store data words. A plurality of data words will typically be stored in each cache line, for example four data words or eight data words. Associated with each cache line is an entry in the CAM portion in which a TAG is stored. Hence, as an example, if each set in the cache 30 illustrated in FIG. 2 has 32 entries, then a cache employing this approach is referred to as a 32-way set associative cache 30.

FIG. 3A illustrates the relationship between the TAG stored in a CAM entry and an address output on the processor address bus 54. As can be seen from FIG. 3A, the address 300 consists of a TAG portion 310, and SET, WORD and BYTE portions 312, 314 and 316, respectively. In preferred embodiments, the SET portion 312 of the address 300 is used to identify a particular set within the cache 30, and the TAG portion 310 of the address 300 is then compared with every CAM entry in the CAM portion of that set. The WORD portion 314 identifies a particular word within the cache line that is the subject of the access by the processor core, whilst the BYTE portion 316 allows a particular byte within the word to be specified if required.

Hence, considering FIG. 3B, which provides a more detailed view of Set 1 of cache 30, the SET portion 312 of the address may identify Set 1 210, in which case the TAG portion 310 of the address 300 will then be compared with every CAM entry 330 within the CAM portion 215 of Set 1 210 of the cache 30. As mentioned earlier, each CAM entry 330 has a corresponding cache line 370 in the RAM portion 217, each cache line containing a plurality of data words. If the TAG portion 310 matches the TAG in one of the CAM entries of CAM portion 215, then the data word in the corresponding cache line 370 identified by the WORD portion 314 will be output from the cache, assuming the cache line is valid (the marking of the cache lines as valid is discussed below).

In addition to the TAG stored in a CAM entry 330 for each cache line 370, a number of status bits are preferably provided for each cache line, and in the preferred embodiments these status bits are also provided within the CAM 215. Hence, associated with each cache line, are a valid bit 340 and a dirty bit 350. As will be appreciated by those skilled in the art, the valid bit 340 is used to indicate whether a data word stored in the corresponding cache line is still considered valid or not. Hence, setting the valid bit 340 will indicate that the corresponding data words are valid, whilst resetting the valid bit 340 will indicate that at least one of the data words is no longer valid.

Further, as will be appreciated by those skilled in the art, the dirty bit 350 is used to indicate whether any of the data words stored in the corresponding cache line are more up-to-date than the data word stored in memory 80. The value of the dirty bit 350 is relevant for write back regions of memory, where a data word output by the processor core and stored in the cache is not immediately also passed to the memory 80 for storage, but rather the decision as to whether that data word should be passed to memory 80 is taken at the time that the particular cache line is evicted, or "flushed", from the cache. Accordingly, a dirty bit 250 which is not set will indicate that the data words stored in the corresponding cache line correspond to the data words stored in memory, whilst a dirty bit being set will indicate that at least one of the data words stored in the corresponding cache line has been updated, and the updated data word has not yet been passed to the memory 80.

In a typical prior art cache, when the data words in a cache line are evicted from the cache, then they will be output to memory 80 for storage if the valid and dirty bits 340, 350 indicate that the data words are both valid and dirty. If the data words are not valid, or are not dirty, then the data words can be evicted without the requirement to pass the data words back to memory 80.

In preferred embodiments of the present invention, a further bit is provided corresponding to each cache line, which will be referred to hereafter as the Write Back (WB) bit 360. In preferred embodiments, the memory 80 has two type of cacheable memory region, the first region being a write back region, and the second region being a write through region. As indicated earlier, when a data word stored in the cache is updated, and it is determined that that data word is from a write back region of memory, then the cache line containing that data word needs to be marked as dirty, but there is no requirement for that updated data word to be written back to memory at that time. In contrast, if it is determined that the data word is from a write through region of memory, then the updated data word is also output to memory at the same time as it is stored in the cache, thereby maintaining synchronisation between the data word in the cache and the data word in the memory. Given that this synchronisation has been maintained, it is clear that there is no requirement to set the dirty bit in this instance.

Figure 4A:
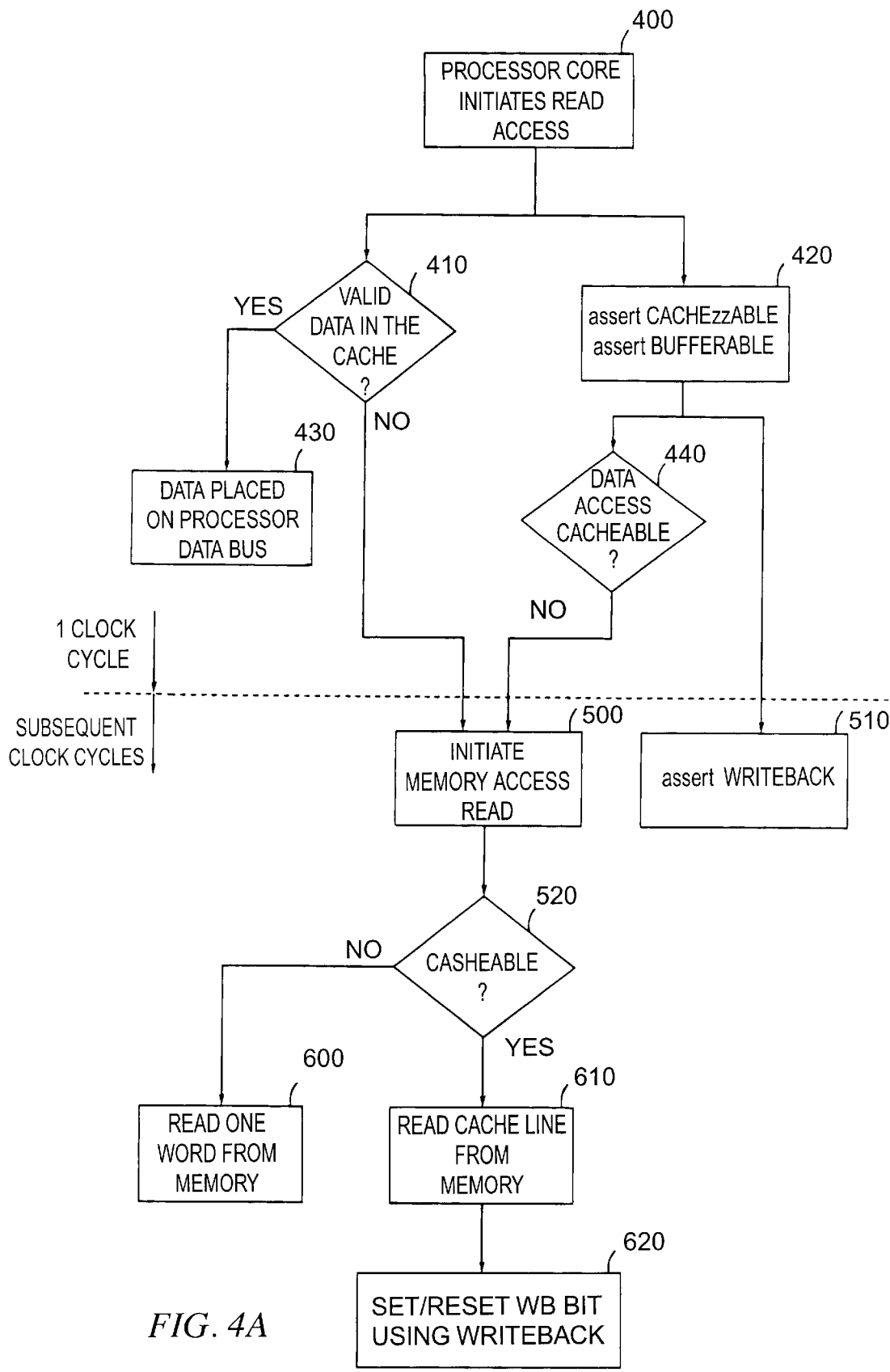
FIG. 4A illustrates steps carried out during a read access in accordance with preferred embodiments of the present invention.

The manner in which the WB bit 360 is used by the cache in preferred embodiments to manage data words stored within the cache will now be described in more detail with reference to FIGS. 4A and 4B. FIG. 4A illustrates the steps performed when the processor core 10 initiates a read access (step 400). Step 400 to 440 all occur in one clock cycle. The processor core 10 will output control and address signals on buses 52 and 54 respectively. This will initiate two simultaneous processes. In step 410, the cache 30 will perform a lookup to see if the cache 30 contains valid data corresponding to the address. In step 420, the protection unit 20 will determine whether the access is cacheable and/or bufferable, and will assert the cacheable and bufferable attributes on paths 140 and 160, respectively. Then, at step 440, if the data word is not cacheable, the process proceeds to step 500 to initiate a memory access read, whilst if the data access is cacheable, no further action is taken at step 440. The process also proceeds from step 420 to step 510, where the protection unit determines whether the access relates to a writeback region and asserts the writeback attribute on path 180 as appropriate.

In this particular embodiment, if valid data is in the cache 30 at step 410, it is output onto the processor data bus 56 in step 430. Further if in step 420 the cacheable attribute is asserted to indicate that the access is cacheable, then together with step 430 the cycle is completed with the processor core 10 reading the data from processor data bus 56.

If valid data is not found in the cache 30 (the cache misses) at step 410, then a memory access to memory 80 will be initiated by the BIU 40 in step 500. Similarly, if the protection unit 20 determines the data access to be non cacheable at step 440, then a memory access to memory 80 will be initiated by the BIU 40 in step 500.

The memory access will take several clock cycles. With reference to FIG. 4A, steps 500 to 520 can be in the second clock cycle whilst the memory access is being initiated by the BIU. If the external memory read access is determined to be non-cacheable at step 520, then one word will be read from memory 80 in step 600. If the read access is determined to be cacheable then the external memory 80 read access will be a linefill in step 610, with a number of data words being read from memory 80 for storage in a particular cache line of the cache 30. These data words are stored in the cache 30 at step 610 and at the same time, at step 620, the WB bit 360 is set dependent on the writeback signal 180 issued at step 510. Accordingly, in step 620, if the writeback signal 180 is set, indicating that the memory region is write back, the WB bit 360 in the CAM entry corresponding to the cache line will be set. Alternatively, if the writeback signal 180 indicates the memory region is write through, the WB bit 360 in the CAM entry corresponding to the cache line will be reset.

As will be discussed in more detail below, the benefit of having provided a WB bit 360, and setting its value at the time of the linefill, is that the cache 30 can then subsequently update a data word in the cache line without having to wait for any indication from the protection unit 20 as to whether that data word is in a write back or a write through region.

Whilst in preferred embodiments, the indication as to whether the data word is in a write through or a write back region is provided to the cache shortly after the cacheable indication 140 via the writeback signal 180, it will be appreciated that since the linefill process is inherently slow, due to the requirement to access and retrieve data words from memory 80, then the protection unit 20 could alternatively be arranged to determine whether the data words being retrieved are in a write through or a write back region of memory whilst the data values are being retrieved, rather than at the time of the cache look up process.

Figure 4B:
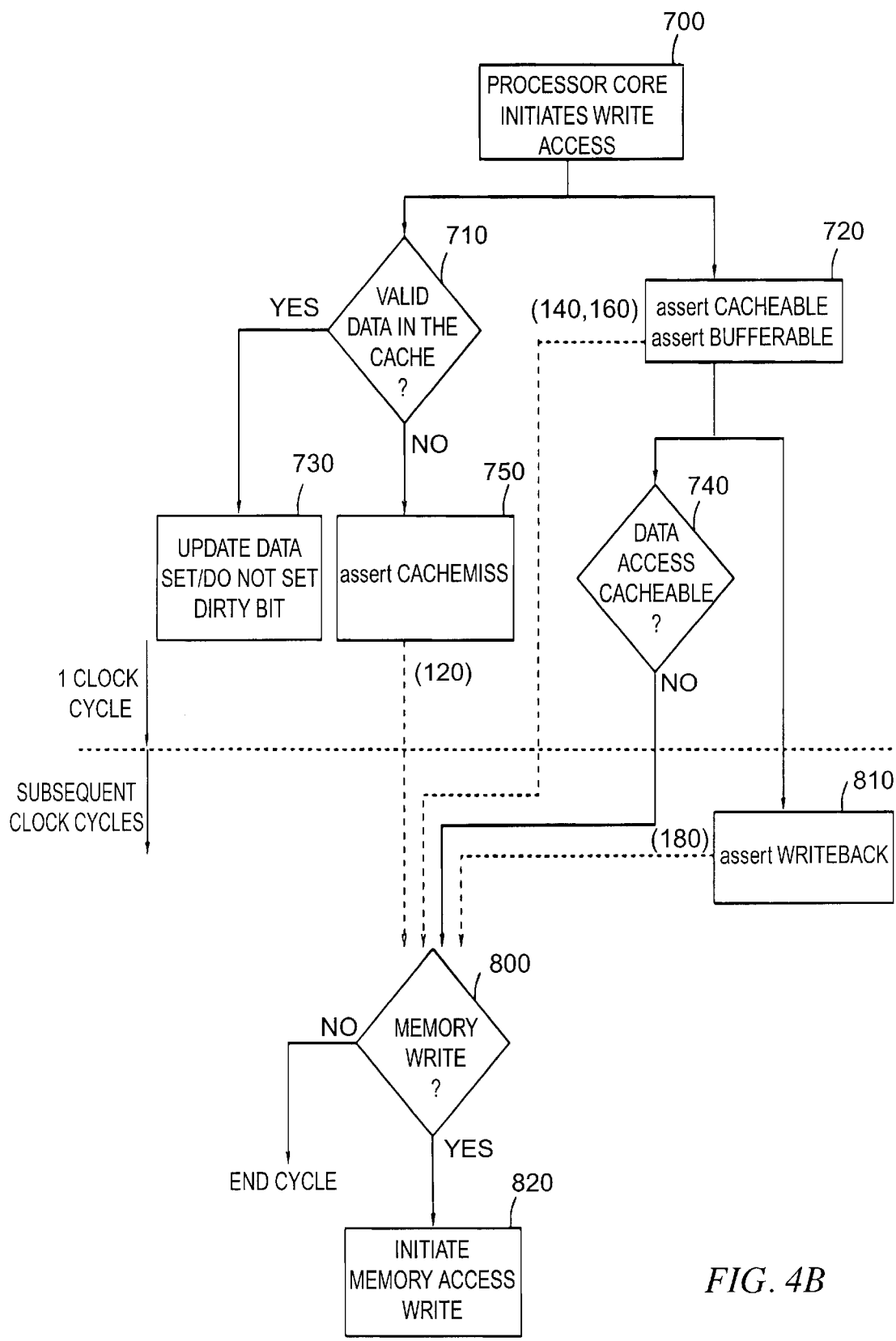
FIG. 4B illustrates steps carried out during a write access in accordance with preferred embodiments of the present invention.

When the processor core 10 requests to store a data word, it will initiate a write access as illustrated at step 700 in FIG. 4B. At this time, the processor core 10 will place a control signal on bus line 52, an address on bus line 54, and the data word to be stored on bus line 56.

This will cause the cache 30 to perform a cache lookup procedure to determine, at step 710, whether the data word indicated by the address resides in the cache. If not, then a cache miss will occur, a cachemiss signal will be asserted over path 120 at step 750, and the cache process will stop. In parallel, in a similar fashion to that described with reference to FIG. 4A, the protection unit 20 will determine the cacheable and bufferable attributes for the memory region (step 720), and will then at step 740 initiate a memory write if the access is non-cacheable. Further, an appropriate writeback signal will be issued at step 810.

However, if the cache determines from the TAG portion 310 and the SET portion 312 of the address that a cache line in the cache contains the relevant data word, then the process will proceed to step 730, whereby the relevant word within that cache line, as indicated by the WORD portion 314 of the address, will be updated with the new data word output by the processor core.

With typical prior art techniques, the cache 30 would also need to wait for an appropriate signal from the protection unit 20 to indicate whether the data word is in a write back or a write through region, in order for the cache to determine whether the dirty bit 350 should be set or not. For example, if the data word is in a write through region, then the dirty bit should not be set, since the updated data word will also be passed directly to the memory 80, and hence the data word in the cache line will correspond to the data word in the memory 80. However, in contrast, if the data word is in a write back region, then the dirty bit should be set to indicate that the data word now stored in the cache line is no longer the same as the data word stored in memory 80. It has been found that the requirement for the cache 30 to await the appropriate signal from the protection unit 20 adversely affects the processing speed of the data processing apparatus, since the write process cannot be completed (by appropriate setting of the dirty bit) until this information has been received by the cache, and the processor core 10 cannot proceed to execute the next instruction until the write process has completed, unless additional cache pipeline logic is provided.

However, in accordance with the preferred embodiments of the present invention, the cache 30 no longer needs to wait for such a signal from the protection unit 20, since an indication as to whether the data words in the cache line are from a write back region or not is already indicated by the write back bit 360 associated with that cache line.

Accordingly, the cache is in preferred embodiments arranged at step 730 to not only store the new data word, but also to apply predetermined criteria to determine whether to set the dirty bit. In a first embodiment of the present invention, the cache 30 is arranged to set the dirty bit 350 if the corresponding WB bit 360 has been set to indicate that the data words in the corresponding cache line are in a write back region. By this approach, it is clear that the dirty bit 350 can be correctly set without awaiting any signal from the protection unit 20 at the time of the cache write, since the dirty bit will not be set if the cache line is in a write through region, and will be set if the cache line is in a write back region. Accordingly, when that cache line is later evicted from the cache, it can be determined that the data words in that cache line need to be output to memory 80 for storage if the dirty bit 350 indicates that the cache line is dirty, and the valid bit 340 indicates that the cache line is still valid.

In an alternative embodiment, the predetermined criteria can be arranged to cause the cache to always set the dirty bit 350 whenever it updates a cache line with a new data word, irrespective of the memory region associated with that data word. Then, subsequently when that cache line is evicted from the cache, the values of the write back bit 360, the valid bit 340 and the dirty bit 350 are all reviewed to determine whether the data words should be sent to the memory 80 for storage. Hence, in that embodiment, if the valid bit 340 indicates that the cache line is valid, the dirty bit 350 indicates that the cache line is dirty, and the WB bit 360 indicates that the cache line is in a write back region, then the data words in the cache line will be output from the cache for storage in the memory 80.

It should be noted that whilst, in preferred embodiments, only one dirty bit 350 is provided per cache line, more dirty bits per cache line could be provided if desired, up to one dirty bit per data word. For example, if a cache line contains eight data words, then two dirty bits could be provided, one for each four words of the line.

In addition to the above procedure being carried out within the cache when the processor core 10 initiates a write access, the protection unit 20 is also arranged to examine the processor control and address signals on bus lines 52 and 54 in order to determine that a write procedure is taking place, and to determine whether the write is directed to a write through region or a write back region. If the data word is in a write back region, and a cache hit occurs (i.e. no cache miss signal is issued on path 120), it is determined at step 800 that no further action is required. However, if the data word is in a write through region, or in a write back region and a cache miss occurs (as indicated by the signal on path 120), or in a non-cacheable region, then it is determined at step 800 that a memory write is required, and the BIU 40 initiates a write access to memory 80 at step 820.

In the event of a write access to a write through region of memory 80, or to a write back region in the event of cache miss, or to a non-cacheable region, the BIU 40 will use control information supplied by the protection unit 20 and the cache 30 (cache miss indication 120) to determine whether the data is to be written, and whether it is bufferable or not, and will instruct write buffer logic within the BIU accordingly. It should be noted that in preferred embodiments, the BIU 40 samples the address, data and control signals on processor bus 50 without waiting for the necessary signals from the protection unit 20 and cache 30. When the BIU 40 subsequently receives the signals from the protection unit 20 and cache 30, it can commit the address, data and control signals to the write buffer.

The write buffer logic within the BIU 40 implements a FIFO write buffer. When the external bus 60 is free, the BIU 40 outputs the next item of bufferable data from the write buffer onto the external bus 60. Once the necessary control, address and data signals have been output onto bus line 62, 64 and 66 respectively, the memory 80 will use the control signal to control the write access to the memory. Once that data word has been stored in the memory, the next data word will be output by the write buffer to the external bus 60.

If it is determined that the address to which the data is to be stored is not bufferable, then the BIU 40 will instruct the write buffer to output the processor control, address and data information directly. However, prior to doing this, the write buffer logic would typically drain any entries in the write buffer, so as to ensure that the write instructions are processed in the correct order. Once the non-bufferable data corresponding to the current write instruction has been stored in the memory 80, the next instruction can then be processed by the processor core 10.

Figure 5:
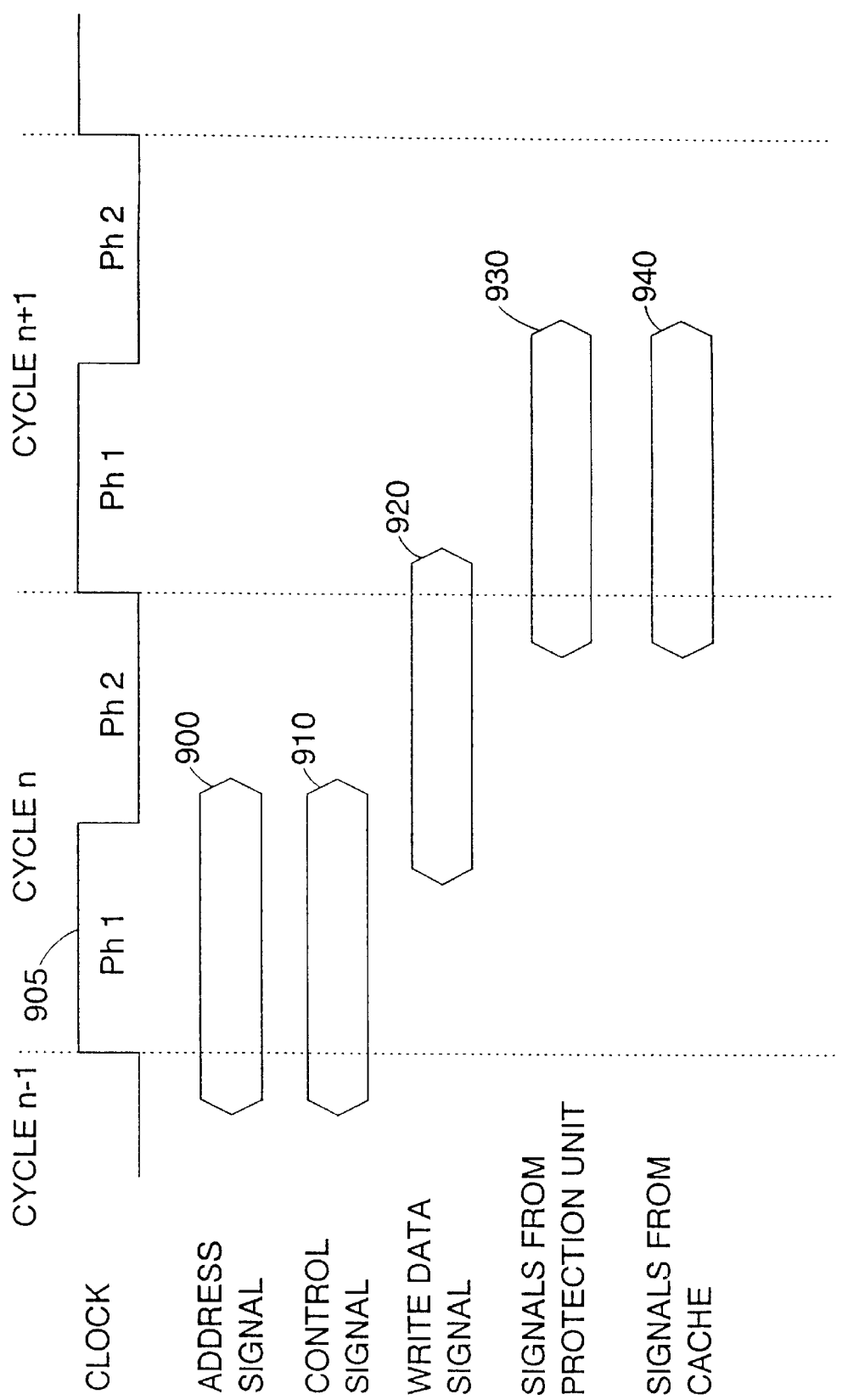
FIG. 5 is a timing diagram illustrating the timing of certain signals during a write access by the processor core in accordance with preferred embodiments of the present invention.

To illustrate the timing benefits realized through the use of the technique of preferred embodiments of the present invention, reference will now be made to FIG. 5, which illustrates the timing of certain signals during a write access by the processor core. With reference to FIG. 5, each cycle starts and finishes on the rising edge of the clock signal 905. It can be seen from the figure that each cycle consists of two phases, phase 1 when the clock signal is high, and phase 2 when the clock signal is low. During phase 2 of cycle n−1, the processor core 10 outputs the necessary address 900 and control 910 data on to the buses 54 and 52, respectively, and during phase 1 of cycle n outputs the write data 920 on to the bus 56. As discussed earlier, this causes the cache 30 to perform a cache lookup, and the protection unit 20 to determine certain attributes (e.g. bufferable, cacheable) relevant to the write access. The results of the cache lookup is illustrated in FIG. 5 generally by the signal 940, whilst the signals output by the protection unit 20 are indicated generally by the signal 930 in FIG. 5. As is clear from FIG. 5, the responses from the cache and the protection unit are set during phase 2 of cycle n. The BIU 40 pipelines the committing of data to the write buffer to cycle n+1, but samples the address, data and control signals in cycle n. It can therefore wait until phase 1 of cycle n+1 until the protection unit and cache have produced the necessary status signals 930, 940, and does not rely on any critical timing of those signals.

However, in contrast, without the use of the technique of preferred embodiments, there is a critical path in getting the write through/write back information from the protection unit 20 to the cache 30 in time for it to complete the write process in phase 2 of cycle n, so that the processor core can proceed to the next instruction in cycle n+1. Accordingly, it is critical that the cache 30 know whether the data being written is in a write back region by the end of phase 2 of cycle n. From FIG. 5, it would appear that this is feasible since the necessary information is generated by the protection unit towards the end of phase 2 of cycle n. However, the problem is that the information must get to all of the cache sets, and right through the cache to the write drivers. This involves a significant routing of the necessary information, this routing increasing as the cache gets larger.

In accordance with preferred embodiments of the present invention, this problem is resolved by providing a WB bit within the cache, which is set at the time the data is originally loaded into the cache during the linefill process, so that during any subsequent write process, that information is readily available to the dirty bit driver of the cache, without the need to wait for this information from the protection unit.

Accordingly, it can be seen from the above description that, by providing a WB bit 360 for each cache line of the cache, and by setting that WB bit during the initial linefill process when the data word is being read from memory 80 into the cache 30, then this subsequently allows the process of updating data words in the cache to be achieved significantly more quickly, thereby reducing the time before the processor core 10 can proceed to execute the next instruction. Hence the efficiency of the overall data processing apparatus is significantly increased.

Although a particular embodiment of the invention has been described herewith, it will be apparent that the invention is not limited thereto, and that many modifications and additions may be made within the scope of the invention. For example, the above description of a preferred embodiment has been described with reference to a unified cache structure. However, the technique could alternatively be applied to the data cache of a Harvard architecture cache, where separate caches are provided for instructions and data. Further, various combinations of the features of the following dependent claims could be made with the features of the independent claims without departing from the scope of the present invention.

I claim:

1. A data processing apparatus, comprising:

a cache having a plurality of cache lines for storing data values retrieved from a plurality of memory regions of a memory, a first memory region being such that when a data value from that first memory region is stored in the cache and is subsequently updated within the cache by a new data value, the new data value is not transferred to memory until that new data value is removed from the cache;

a marker associated with each cache line and being settable to indicate that the data values stored in the corresponding cache line are from said first memory region;

a protection unit for determining control parameters for controlling the transfer of data values between the cache and the memory, and being arranged, when said data values are to be loaded from the memory into a cache line of the cache, to determine whether said data values are from said first memory region and to cause the marker to be set accordingly; and a processor core arranged to output a new data value for storage;

the cache being arranged to determine if the new data value output by the processor core is to replace a data value stored in a cache line of the cache, and if so to update the corresponding cache line with the new data value, and to apply predetermined criteria to determine whether to set an update identifier indicating that the data value has been updated by the new data value, such that when the new data value is subsequently removed from the cache it can be determined whether to transfer that new data value to the memory.

2. A data processing apparatus as claimed in claim 1, wherein the predetermined criteria identify that the update identifier should be set if the marker is set, whereby when the new data value is subsequently removed from the cache, the update identifier is used to determine whether to transfer that new data value to the memory.

3. A data processing apparatus as claimed in claim 1, wherein the predetermined criteria identify that the update identifier should be set whenever a data value associated with that update identifier is updated, whereby when the new data value is subsequently removed from the cache, the update identifier is used in combination with the marker to determine whether to transfer that new data value to the memory.

4. A data processing apparatus as claimed in claim 1, wherein the marker comprises a marker field provided in the cache for each cache line, the marker for a particular cache line being set by storing a predetermined logic value in the corresponding marker field.

5. A data processing apparatus as claimed in claim 4, wherein each marker field comprises a single bit.

6. A data processing apparatus as claimed in claim 1, wherein the update identifier comprises a dirty field provided in the cache for each cache line, the update identifier for a particular cache line being set by storing a predetermined logic value in the corresponding dirty field.

7. A data processing apparatus as claimed in claim 6, wherein each dirty field comprises a single bit.

8. A data processing apparatus as claimed in claim 1, wherein the first memory region is a "write back" region, and at least one further memory region is a "write through" region.

9. A data processing apparatus as claimed in claim 1, wherein each data value stored in a cache line comprises a data word.

10. A data processing apparatus as claimed in claim 2, wherein the cache further comprises a validity identifier associated with each cache line which is set to confirm hat the data values stored in the corresponding cache line are valid, and is resettable to indicate that at least one of the data values stored in the corresponding cache line has been invalidated, the validity identifier being used in combination with the update identifier to determine whether to transfer the new data value to the memory.

11. A data processing apparatus as claimed in claim 3, wherein the cache further comprises a validity identifier associated with each cache line which is set to confirm that the data values stored in the corresponding cache line are valid, and is resettable to indicate that at least one of the data values stored in the corresponding cache line has been invalidated, the validity identifier being used in combination with the marker and the update identifier to determine whether to transfer the new data value to the memory.

12. A method of managing a cache in a data processing apparatus, the cache having a plurality of cache lines for storing data values retrieved from a plurality of memory regions of a memory, a first memory region being such that when a data value from that first memory region is stored in the cache and is subsequently updated within the cache by a new data value, the new data value is not transferred to memory until that new data value is removed from the cache, the method comprising the steps of:

(a) providing a marker associated with each cache line which is settable to indicate that the data values stored in the corresponding cache line are from said first memory region;

(b) when said data values are to be loaded from the memory into a cache line of the cache, determining whether said data values are from said first memory region;

(c) setting the marker dependent on the determination at said step (b);

(d) determining if a new data value is to replace a data value stored in a cache line of the cache, and if so updating the corresponding cache line with the new data value; and (e) upon updating the corresponding cache line with the new data value, applying predetermined criteria to determine whether to set an update identifier indicating that the data value has been updated by the new data value, such that when the new data value is subsequently removed from the cache it can be determined whether to transfer that new data value to the memory.

* * * * *